United States Patent
Duan et al.

(10) Patent No.: US 9,544,785 B2
(45) Date of Patent: *Jan. 10, 2017

(54) METHOD FOR PROVISIONING A WIRELESS NETWORK

(71) Applicant: AT&T Intellectual Property I, LP, Atlanta, GA (US)

(72) Inventors: Rong Duan, Summit, NJ (US); Siu-Tong Au, Bedminster, NJ (US); Heeyoung Kim, Atlanta, GA (US); Guang-Qin Ma, Kendall Park, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 77 days.

This patent is subject to a terminal disclaimer.

(21) Appl. No.: 14/511,562

(22) Filed: Oct. 10, 2014

(65) Prior Publication Data

US 2015/0024768 A1    Jan. 22, 2015

Related U.S. Application Data (63) Continuation of application No. 12/964,472, filed on Dec. 9, 2010, now Pat. No. 8,861,353.

(51) Int. Cl.
| | |
|---|---|
| *G01R 31/08* | (2006.01) |
| *H04M 3/00* | (2006.01) |
| *H04W 24/02* | (2009.01) |
| *H04L 12/24* | (2006.01) |
| *H04L 12/26* | (2006.01) |
| *H04W 24/08* | (2009.01) |
| *H04W 16/24* | (2009.01) |

(52) U.S. Cl.
CPC .......... *H04W 24/02* (2013.01); *H04L 41/0816* (2013.01); *H04L 43/067* (2013.01); *H04W 16/24* (2013.01); *H04W 24/08* (2013.01); *H04L 43/16* (2013.01)

(58) Field of Classification Search
CPC .... H04L 43/067; H04L 43/16; H04L 41/0816; H04W 24/08; H04W 28/0289; H04W 28/10; H04W 28/12; H04W 4/00
USPC ............... 370/230.1, 252–256, 341, 242, 328,370/352–356, 245–247; 455/456, 457, 524, 455/525, 450–452, 423, 446, 453
See application file for complete search history.

(56) References Cited

U.S. PATENT DOCUMENTS

| | | |
|---|---|---|
| 6,092,020 A | 7/2000 | Fastenrath et al. |
| 7,466,672 B2 | 12/2008 | Van Der Burg et al. |

(Continued)

OTHER PUBLICATIONS

"Accepted Challenges to Vintage 2007 Population Estimates," U.S. Census Bureau, http://www.census.gov/popest/data/historical/2000s/vintage_2007/07s_challenges.html, downloaded Jul. 18, 2012, 2 pages.

(Continued)

*Primary Examiner* — Hanh N Nguyen
(74) *Attorney, Agent, or Firm* — Zagorin Cave LLP (57) ABSTRACT

A method collects data and subjects it to statistical analysis to detect localized events, which assists in network provisioning. Illustratively, the data employed is hourly network traffic counts that are collected at cell sites. By taking advantage of the additive property of a Poisson process, the method integrates spatial neighbor information by aggregating temporal data in various areas, and iteratively estimating the event location and the radius of event impact by examining the posterior probability based on the aggregated data.

20 Claims, 4 Drawing Sheets

(56) References Cited

U.S. PATENT DOCUMENTS

| | | | |
|---|---|---|---|
| 8,050,671 | B2 | 11/2011 | Calin et al. |
| 8,077,049 | B2 | 12/2011 | Yaney et al. |
| 8,310,918 | B2 | 11/2012 | Poulson et al. |
| 8,861,353 | B2 * | 10/2014 | Duan .................... 370/230.1 |
| 2009/0186610 | A1 | 7/2009 | Avni et al. |
| 2010/0015926 | A1 | 1/2010 | Luff |

OTHER PUBLICATIONS

Abadi, D. J., Madden, S., and Lindner, W., "REED: Robust, Efficient Filtering and Event Detection in Sensor Network," Proceedings of the 31st VLDB Conference, Trondheim, Norway, 2005, pp. 769-780.

Anderson, J., Rappaport, T., and Yoshida, S., "Propagation Measurements and Models for Wireless Communications Channels," IEEE Communications Magazine, Jan. 1995, pp. 42-49.

"AT&T Mobility Gears Up Wireless Network for Super Bowl XLIII," Tampa, FL, Las Vegas-CES, Nevada, Jan. 14, 2009, http://www.att.com/gen/press-room?pid=4800&cdvn=news&newsarticleid=26478, downloaded Jul. 18, 2012, 2 pages.

"AT&T Investment in California Network Aimed at Enhancing Mobile Broadband Service Across the State," Sacramento, California, Feb. 16, 2010, http://www.att.com/gen/press-room?pid=4800&cdvn=news&newsarticleid=30518, downloaded Jul. 18, 2012, 4 pages.

Duan, R., Man, H., Jiang, W., and Lui, W., "Activation Detection on FMRI Time Series Using Hidden Markov Model," Proceedings of the 2nd International IEEE EMBS Conference on Neural Engineering, Arlington, VA, Mar. 16-19, 2005, 4 pages.

Frost, V.S., and Melamed, B., "Traffic Modeling for Telecommunications Network," IEEE Communications Magazine, Mar. 1994 pp. 70-81.

Goldstein, P., "Verizon-led investment group commits $1.3B to LTE development," FierceWireless, Oct. 5, 2009, http://www.fiercewireless.com/node/50548/print, downloaded Jul. 18, 2012, 1 page.

Guralnik, V. and Srivastava, J., "Event Detection from Time Series Data," Department of Computer Science, University of Minnesota, 1999, pp. 33-42.

Ihler, A., Hutchins, J. and Smyth, P., "Adaptive Event Detection with Time-Varying Poisson Processes," School of Information and Science, University of California, 2006, 10 pages.

Kulldorff, M., "A Spatial Scan Statistic," Commun. Statist.—Theory Meth. 26(6), 1997, pp. 1481-1496.

Kulldorff, M., "Prospective time periodic geographical disease surveillance using a scan statistic," J. R. Statist, Soc. A(2001) 164, Part 1, pp. 61-72.

Naus, J., "The Distribution of the Size of the Maximum Cluster of Points on a Line," American Statistical Association Journal, Jun. 1965, pp. 532-538.

Scott, S., "Bayesian Methods and Extensions for the Two State Markov Modulated Poisson Process," Ph.D. Dissertation, Harvard University, Dept. of Statistics, May 1998, 131 pages.

Scott, S., "Detecting Network Intrusion Using a Markov Modulated Nonhomogeneous Poisson Process," Assistant Professor of Statistics, The Marshall School of Business, University of Southern California, Los Angeles, CA, Jun. 14, 2000, pp. 1-23.

Scott, S. and Smyth, P., "The Markov Modulated Poisson Process and Markov Poisson Cascade with Applications to Web Traffic Modeling," Bayesian Statistics, 2003, 10 pages.

Solis, I. and Obraczka, K., "Efficient Continuous Mapping in Sensor Networks Using Isolines," Computer Engineering Department, University of California, Santa Cruz, CA, Apr. 15, 2005, 8 pages.

Tobler, W., "A Computer Movie Simulating Urban Growth in the Detroit Region," Economic Geography, vol. 46, 1970, pp. 234-240.

"Verizon Wireless Invests Nearly $485 Million to Boost 3G Coverage and Capacity in California in 2009," http://news.verizonwireless.com/news/2010/02/pr2010-02-10i.html, Feb. 10, 2010, downloaded Jul. 18, 2012, 2 pages.

"Verizon Wireless Boosts Super 3G Wireless Services for Football's Big Game, Year-Round Events in Miami," http://news.verizonwireless.com/news/2010/02/pr2010-02-01a.html, Feb. 1, 2010, downloaded Jul. 18, 2012, 2 pages.

Wang, T. and Yu, C., "Collaborative Event Region Detection in Wireless Sensor Networks Using Markov Random Fields," IEEE, 2005, pp. 493-497.

Wang, X., Lizier, J., Obst, O., Prokopenko, M., and Wang, P., "Spatiotemporal Anomaly Detection in Gas Monitoring Sensor Networks," R. Verdone (Ed.): EWSN 2008, LNCS 4913, pp. 90-105.

"Super Bowl," http://en.wikipedia.org/wiki/Super_Bowl_XLIV, 2010, downloaded Jul. 18, 2012, 14 pages.

Xue, W., Luo, Q., Chen. L., and Liu, Y., "Contour Map Matching for Event Detection in Sensor Networks," Department of Computer Science, Hong Kong University of Science and Technology, SIGMOD 2006, Jun. 27-29, 2006, Chicago, Il, pp. 145-156.

Li, M., Liu, Y., and Chen, L., "Non-Threshold based Event Detection for 3D Environment Monitoring in Sensor Networks," Department of Computer Science and Engineering, Hong Kong University of Science and Technology, 27th International Conference on Distributed Computing Systems (ICDCS'07) 2007, 8 pages.

* cited by examiner

FIG. 1

1    for *i* from 1 to *m*

2        calculate $D^i = \max(N^i) - Q_x(N^i) - TH$ 3    end for 4    discard all $D^i < 0$ and sort remaining by traffic level (i.e., $D^1 > D^2 > ... > D^n$)

5    for *i* from 1 to *n*

6        find groups of *h* or more consecutive reporting times *t* such that $p(z(t)=1 | N^i(t)) > 0.5$ 7        $E^i = $ # of such groups, each is an impacting event 8        for j from 1 to $E^i$ 9            compute event duration $TD_j^i$ 10           if ($TD_j^i$ is close to already considered event) then 11               add site to the corresponding cluster j = j +1

12               go to line 9

13           end if 14           initialize:
             center c = location of cell site *i*,
             radius, $r = r_0$ of a neighborhood area,
             $A_c^r$, about center c,
             number of time series in $A_c^r$, $C^{A_c^r} = 1$,
             $\Delta C^{A_c^r} = 0$, $TD_j^c = TD_j^i$, $\Delta \sum_{t=t_e}^{t_s} \bar{N}_E^{A_c^r} = a > 0$

FIG. 1 (cont)

| | |
|---|---|
| 15 | while $TD_j^i \approx TD_j^c$ and $\Delta \sum_{t=t_e}^{t_s} \bar{N}_E^{A_c^r} > 0$ |
| 16 |     while $\Delta C^{A_c^r} = 0$ |
| 17 |         $r = r + \Delta r$ |
| 18 |         compute $\Delta C^{A_c^r}$ ($C^{A_c^r} = C^{A_c^r} + \Delta C^{A_c^r}$) |
| 19 |     end while |
| 20 |     $I^{A_c^r}$ is site indices comprising $C^{A_c^r}$ |
| 21 |     compute new center, c |
| 22 |     $\bar{N}^{A_c^r}(t) = $ sum of $N^k, k \in I^{A_c^r}$ |
| 23 |     compute $\bar{N}_E^{A_c^r}(t)$ and duration $TD_j^c$ |
| 24 |   end while |
| 25 |   output |
| 26 |  end for |
| 27 | end for |

METHOD FOR PROVISIONING A WIRELESS NETWORK

CROSS-REFERENCE TO RELATED APPLICATION(S)

This application is a continuation of U.S. patent application Ser. No. 12/964,472, filed Dec. 9, 2010, entitled "Method for Provisioning a Wireless Network," naming Rong Duan, Siu-Tong Au, Heeyoung Kim, and Guang-Qin Ma as inventors, which application is hereby incorporated herein by reference.

BACKGROUND OF THE INVENTION

This relates to development of information from traffic data of a wireless network, where the data includes events that are outside everyday network load. This information assists in anticipating future events and their geographical impact, and thereby assists in provisioning network capacity.

With the fast development of mobility network technology, the network traffic has increased significantly. To improve the mobility network performance, service providers have invested significant resources to improve the coverage, enhance the quality, and increase the capacity. To illustrate, AT&T has invested more than $1.5 billion from 2007 to 2009 in California alone, and a Verizon-led investment group is committing to invest $1.3 billion in wireless long term evolution development.

Differentiated from wireline networks, wireless network quality is relatively dynamic. It is impacted by the nature of the network's use (e.g., time spent by users to download data from the Internet), retransmit rates that are affected by signal to noise ratios, and by the nature of cell phone use. The easy-to-carry mobile phones are much more engaged with human activities than the wired phones, and hence the network traffic is heavily influenced by what people do. A very significant component in the variability of the wireless network's load and the perceived quality of service is social events. At large social events many cell phone users gather in a small area, such as a sports or concert venue, and—unless some provision is made—that causes network capability to overflow. To illustrate how significant an effect an event can have, it is noted that Super Bowl XLIV, for example, which was held at Sun Life Stadium (Miami Garden, Fla.), attracted about 75,000 people, where the normal population for Miami Garden is a bit over 100,000. The call traffic increase is probably much higher than the 175% population increase, and such an increase is not something that the wireless network is typically designed (or should be expected) to handle.

Clearly, it is important to anticipate events. Events such as the Super Bowl are easy to anticipate because they are scheduled months in advance, but there are many lesser events that cannot be easily anticipated because they are not scheduled well in advance. One way to anticipate events is to be aware of past events, and to predict future events based on the past events. Although many events can be accounted for from data other than actual network traffic data, a much more complete picture can be had by detecting events from the network data itself.

From a statistical point of view, in general, there are three types of event detection methods: outlier/change point based method, pattern based method, and model based method. For the model based event detection approach (which underlies the approach of this invention) different models have been constructed based on the characteristics of the measured data. For example, the Dynamic Bayesian Networks (DBNs) approach has been applied to detect abnormal events in underground coal mines, Markov random fields (MRFs) have been used to model spatial relationships at neighboring sensor nodes, and the Hidden Markov Model has been used on fMRT (functional Magnetic Resonance Imaging) to detect activation areas. Ihler et al in "Adaptive Event Detection With Time-Varying Poisson Processes," in *KDD '06, Proceedings of the 12th ACM SIGKDD international conference on Knowledge discovery and data mining*, New York, N.Y., ACM, 2006, pp. 207-216, utilize a Markov Model Modulated Nonhomogeneous Poisson Process to detect events from highway traffic data collected by one sensor at a specific location.

In recent years, scan statistics have been a hot topic in spatial analysis and nowadays it appears to be the most effective "hotspots" detection method. The scan statistics are used to test a point process to see if it is purely random, or if any clusters of events are present. There are numerous variations of spatial scan statistics, but they share the three basic properties: the geometry of the scanned area, the probability distributions generating events under null hypothesis, and the shapes and sizes of the scanning window. The spatial scan statistics measure the log-likelihood ratio for a particular region to test spatial randomness. The region with the largest spatial scan statistic is the most likely to be generated by a different distribution. By extending the scan window from circular to cylindrical, the scan statistic extends from spatial domain to spatiotemporal domain. Scan statistics assumes that the null hypothesis is known or can be estimated through Monte Carlo simulation; but the null hypothesis assumption is often invalid and, moreover, the Monte Carlo simulation is computationally expensive.

SUMMARY

An advance in the art is realized with a method that collects data and subjects it to statistical analysis to detect localized events, which assists in network provisioning. Illustratively, the data employed is hourly network traffic count that is collected at cell sites. By taking advantage of the additive property of Poisson process, the disclosed method integrates spatial neighbor information by aggregating temporal data in various areas, and iteratively estimating the event location and the radius of event impact by examining the posterior probability based on the aggregated data.

DETAILED DESCRIPTION

It is well established that network traffic varies with time of day, and also varies with days of the week. Identifying events in such network traffic data is ideally accomplished by learning the normal traffic pattern and special event pattern. However, this problem is challenging due to unknown baselines for normal traffic as well as unknown event information, such as event location, and event duration. Another challenge is the fact that not only the temporal information, but also the spatial information ought to be taken into account.

To accurately assess event influence to network, it is necessary to consider an event's impact on multiple neighboring cells, where the cells are likely to have different traffic patterns either naturally (e.g., proximity to a train station) or driven by different events. The large amount of data is another difficulty in the network traffic event detection since the necessary computing might be unfeasible even though the computing increases only linearly with data.

Markov Modulated Poisson Process (MMPP) is a popular traffic model for capturing the characteristic of actual network load by describing varying rate parameters at irregular intervals according to a Markov process which, basically asserts that the probability of a data point in a series depends on data points that immediately precede it. In "Bayesian Methods and Extensions for the Two State Markov Modulated Poisson Process," S. L. Scott, in *Ph.D. dissertation, Harvard University, Dept. of Statistics*, 1998, extends the MMPP from homogeneous Poisson process to non-homogeneous Poisson process by embedding multiple periodic rates in Poisson process, and applies it to network intrusion detection and web traffic data. Ihler et al. in the aforementioned article utilize the similar framework on freeway traffic and building entrance event detection. All of the proposed methods focus on univariate time series.

To better appreciate the advance of this invention, it may be helpful to review the Markov Modulated Non-Homogeneous Poisson Process (MMNHPP) for modeling temporal data.

Let $N^i(t)$ denote the observed traffic count at cell site i (i $\in \Re$) and time t, where $\Re$ denotes the considered region, and cell site i is at location $L_i$, which is specified by its latitude, $11_i$, and longitude, $12_i$; i.e., the vector $L_i=[11_i, 12_i]$. The actual traffic load (e.g., call count) at cell site i, as a function of reporting times, $N_i(t)$, can be represented as $N^i(t)=N_0^i(t)+N_E^i(t)$, where $N_0^i(t)$ is the normal traffic load, and $N_E^i(t)$ is the increased traffic load due to the presence of one or more events. It is sufficient to model $N_0^i(t)$ and $N_E^i(t)$ instead of modeling $N^i(t)$ directly. To model $N_0^i(t)$ we adopt a non-homogeneous Poisson process with the rate $\lambda^i(t)$ which, to incorporate the multiple periodic temporal patterns in network traffic, is assumed to be $$\lambda^i(t) = \lambda_0^i \sigma_{d(t)}^i \eta_{d(t),h(t)}^i, \quad (1)$$

where $\lambda_0^i$ is the average rate of the Poisson process over a week at cell site i, $\sigma_{d(t)}^i$ is the day effect (d(t) indicates the day-of-week, d $\in \{1,2, \ldots, 7\}$), and $\eta_{d(t),h(t)}^i$ is the hour effect (h(t) indicates the hour-of-day, h $\in \{0,1, \ldots, 23\}$). Given a sequence of data, we assume that $\lambda_0^i$ follows a Gamma distribution, and $\sigma_{d(t)}^i \eta_{d(t),h(t)}^i$ follow a Dirichlet distribution.

Now we consider the modeling of $N_E^i(t)$ for the case where events increase the network traffic during a short consistent period (in some applications, it may be more reasonable to consider the case where events decrease the traffic). To indicate the presence of an event at time t, we use a binary process z(t):

$$z(t) = \begin{cases} 0 & \text{if there is no event at time } t \\ 1 & \text{if there is an event at time } t \end{cases} \quad (2)$$

The probability distribution of z(t) is defined to be a two-state Markov process with transition matrix:

$$M_z = \begin{pmatrix} 1-z_0 & z_1 \\ z_0 & 1-z_1 \end{pmatrix} \quad (3)$$

where the expected value for the time between events is $1/z_0$ and the expected value for event duration is $1/z_1$. Using z(t), the event count $N_E^i(t)$ can be modeled as Poisson with the rate $\gamma^i(t)$ $$N_E^i(t) = \begin{cases} 0 & z(t) = 0 \\ P(N^i, \gamma^i(t)) & z(t) = 1 \end{cases} \quad (4)$$

The unknown parameters in the models for $N_0^i(t)$ and $N_E^i(t)$ can be estimated in the Bayesian framework. Essentially, Markov Chain Monte Carlo (MCMC) sampling is used to estimate the posterior probability $p(z(t)=1|N(t))$, as described in the aforementioned Ihler et al. article.

Put in layman's terms, in the MMNHPP a given a set of data points is assumed to consist of data points that at times correspond to traffic with no special events present, and at times correspond to traffic that may be including a special event. There is, therefore, a distribution of traffic load measurements without an event, and a distribution of traffic load measurements with an event. The challenge is to find the parameters of the two distributions that best fit the data, under the assumption that those distributions are extended Poisson distributions, where the probability of k events in a given period of time is $$f(k, \lambda) = \frac{\lambda^k e^{-\lambda}}{k!},$$

where $\lambda$ is the expected number of events in that given period of time, it is a function of time t, and is different for the two conditions: with event, and without event.

Once the best-fitting parameters are chosen, the probability that a given data point belongs to non-event data can be computed, and the probability that the same given data point belongs to event data can also be computed. If the probability that the given point belongs to event data is greater than the probability that the given point belongs to non-event data, then the conclusion is reached that the point belongs to an event.

How to find the best parameter estimates for the aforementioned distributions based on a given corpus of data is well known to artisans in the art of data analysis.

It may be noted that the model discussed above is for a time series at a single cell site i, and the spatial relations among multiple time series are not considered. In accord with the principles disclosed herein spatial information is taken into account.

Recognizing that "everything is related to everything else, but near things are more related than distant things," our strategy is to aggregate a set of closely located time series of similar pattern. Specifically, we define a neighborhood region around the cell site i with the radius r as $A_i^r=\{j; \|L_j-L_i\|<r\}$ where $\|L_j-L_i\|$ represents the geographic distance between cell sites i and j. That is, the neighborhood of cell site i, $A_i^r$, encompasses at least one additional site.

The observations in $A_i^r$ can be represented as $$N^{A_i^r} = N_0^{A_i^r} + N_E^{A_i^r} \quad (5)$$

were $N_O^{A_i^r}$ and $N_E^{A_i^r}$ are the total normal and event observations for all time series in area $A_i^r$, respectively. Thus, $N_O^{A_i^r}$ and $N_E^{A_i^r}$ can be represented as $$N_0^{A_i^r} = \sum_{j \in A_i^r} N_0^j(t)$$

and $$N_E^{A_i^r} = \sum_{j \in A_i^r} N_E^j(t),$$

respectively.

According to the additive property of the non-homogeneous Poisson process, $N_O^{A_i^r}$ is also a non-homogeneous Poisson process given that all time series in $A_i^r$ are independent Poisson random variables. Hence, the count rate for the neighborhood region $A_i^r$ can be expressed as $$\lambda_0^{A_i^r}(t) = \sum_{j \in A_i^r} \lambda_0^j(t) \tag{6}$$

$$= \sum_{j \in A_i^r} \lambda_0^j(t) \sigma_{d(t)}^j h(t).$$

We assume that if an event happens at a particular time, it affects the neighboring cells roughly simultaneously, i.e., the starting and ending points of the increased traffic for the affected cells are assumed to be similar enough. Then the temporal Markov process transition matrices for the neighboring cells are also assumed to be the same. We also utilize the fact that driven by the propagation of cellular radio signal, the farther the distance from the signal source, the weaker the signal strength. It is known that if the signal originates from a location $L_e$, then the strength of the signal at location $L_i$ can be expressed as $$\frac{a}{\|L_e - L_i\|^n},$$

where n is a value between 2 and 4 depending on geography conditions, and a is a constant.

In addition to the cellular radio propagation property, from engineering design view, the closer the cell site to the signal, the higher the priority it has. The signal will be picked by farther cell only if the closer one is in overflow. Driven by the above, the spatial impact of an event can be modeled as a binary function that relates the current location and the distance from where the event happens.

When an event takes place at location e, the event's impact at location i, can be expressed as a binary process, as follows:

$$s_i^e = \begin{cases} 0, & \|L_e - L_i\| > R_e \\ 1, & \|L_e - L_i\| \le R_e \end{cases} \tag{7}$$

where $R_e$ is the radius of event impact. Combining (1) and (6), in spatiotemporal domain, the presence of an event can be indicated by the product of $z(t)$ and $s_i^e$. That is, if we let $$ST_{it}^e = \begin{cases} 0, & \|L_e - L_i\| > R_e \text{ or } z(t) = 0 \\ 1, & \|L_e - L_i\| \le R_e \text{ and } z(t) = 1 \end{cases} \tag{8}$$

equation (8) implies that the event originates from e only impacts the cells in the area $A_e^{R_e}$ while $z(t)=1$. Using equation (8), the increased observations due to the event can be modeled as a Poisson process:

$$N_E^{A_e^{R_e}}(t) \sim \begin{cases} 0, & \text{while } ST_{it}^e = 0 \\ P\left(N; \sum_{j \in A_e^{R_e}} \gamma^j(t)\right) & \text{while } ST_{it}^e = 1 \end{cases} \tag{9}$$

From equations (8) and (9) it is obvious that an event impact is explained by its temporal duration, event location, and the impact radius. As discussed above, the temporal durations are assumed to be the same for all cells in the impacted area $A_e^{R_e}$ and, hence, the duration can be estimated by a Markov process using any of time series in the area $A_e^{R_e}$.

The method disclosed herein comprises collecting data, processing to obtain results, and utilizing the results. The processing, in turn, comprises initialization, aggregation, estimation, re-centralization, and adaptation, where the initialization, aggregation, estimation, re-centralization, and adaptation are iteratively repeated until a preselected criterion is met. The key tasks in each stage are presented in the following.

Initialization:

Overall network traffic data is very voluminous so examining all these cell sites is prohibitively expensive in terms of computation cost. Therefore, in accord with one aspect of our disclosure, we begin by identifying a subset of cell sites where a very simple test reveals that at least one event impacts the traffic. This is accomplished by choosing those cells whose peak traffic during the observed time period (the time series of data for the cell) exceeds the traffic value during a chosen portion of the observed time period (e.g., during 75% of the time period), by a preselected amount, and ranking the identified cells by the computed traffic level. We call the identified set the "seed" cell sites, or time series. We note that each event reveals itself as a "seed" in one or more cell sites. We also noted that the above-described approach for limiting the number of cells that are considered is merely illustrative, and that other approaches can be used without departing from the spirit and scope of this invention.

Aggregation:

Choosing each cell in the seed time series we aggregate the data from all cells in a defined neighborhood of the chosen cell, and in an iterative process we increase the size of the neighborhood until a predetermined condition occurs (e.g., acquiring, albeit the smallest number of cell sites).

Estimation:

By fitting the aggregated time series with MMNHPP, we compute the posterior probability of event $p(z(t)=1)$. If $p(z(t)=1)>0.5$ for time $[t_s,t_e]$ (i.e., time t spanning $t_s-t_e$, and $t_e-t_s>h$ hours (where h, for example, is 3 hours)), then we consider that all of aggregated the time series are affected by some event during the time period of $[t_s,t_e]$; i.e., $t_s$ and $t_e$ the starting and ending time points of the event, respectively. Otherwise, we regard it as an outlier. For example, if there is a one hour spike in traffic, we do not consider that to be an event. For a specific detected event, the corresponding time series that were aggregated are the members of the cluster for the event.

Centralization:

For each detected event cluster, we compute the center point by taking an average of the coordinates for all cells that are included in the cluster. The computed center point may be a simple geographical center of all cell sites in the cluster. The geographical center calculation is constrained to not exceed certain bounds, such as to not move farther away from the location of the seed cell than a certain distance. Alternatively, the geographical center can be a weighted calculation that takes account of both geographical locations and traffic levels.

Adaptation:

We set the computed center as the new point about which a neighborhood is computed, and return to the step of aggregating the data from neighboring cells (starting with the existing size of the neighborhood). Repeat the aggregation, estimation, and centralization steps until a cell site (and a corresponding time series) is encompassed by the neighborhood but is not impacted by the event under consideration. The underlying assumption here is that if a set of time series with no event is aggregated to the time series with an event X, the effect of event X will be masked somewhat, and we will have reduced probability of concluding that an event occurs. In other words, the decision as to whether to further expand the neighborhood is based on statistical analysis of the aggregated time series (as disclosed above).

The result of the above process is that the center where the event is perceived to originate (in a center of gravity sense), the spatial impact of the event, and the temporal impact of the event become known.

It should be understood that there are various approaches for addressing all of the events that are contained in the data. That includes searching for event-impacts in time order, in order of seed strengths, or in any other order (including random).

Figure 1:
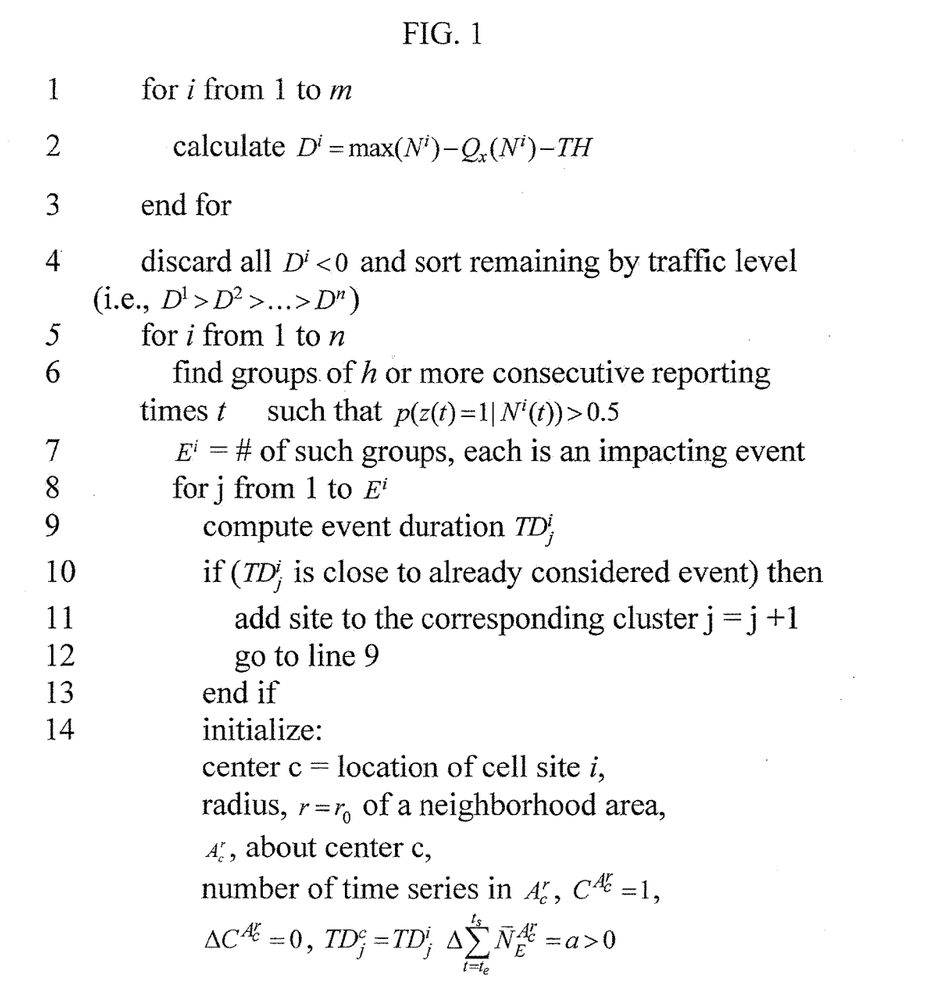
FIG. 1 presents pseudo code that represents one embodiment in accord with the principles disclosed herein.

FIG. 1 presents the pseudocode of one embodiment in accord with the principles disclosed herein, where the seed sites are sorted by strength, but once a seed site is under investigation, all events that impact that site are considered. Although the pseudocode is straight forward and self-explanatory, the following presents a relatively detailed explanation of the code.

In line 1, the variable m corresponds to the number of cell sites whose traffic data has been collected, $max(N^i)$ is the maximum traffic load (e.g., number of calls) at cell site i, at some reporting time interval (e.g., hour), t. $Q_x(N^i)$ is the traffic level that is not exceeded for x percent of the time, and TH is a chosen threshold. For example, the maximum number of calls in a certain hour of a certain date cell site i might be 1021 (i.e., $max(N^i)=1021$), whereas during 75% of all other hours the number of calls in cell i does not exceed 750 (i.e., $Q_{75}(N^i)=750$). Line 4 results in a sorted set of traffic load values $D^i$, each thus identifying cell i where at least one event has an impact. These are seed cell sites.

Line 5 begins the process for considering each of the seed cell sites, starting with a first cell site (i=1), and line 6 identifies spans of reporting times, or groups of consecutive reporting times, that correspond to times in the considered cell site during which there are event impacts. The number of consecutive reporting times that must be found to constitute a group is a preselected constant, h, such as the aforementioned three hours. The number of such groups is $E^i$ (line 7).

Line 8 begins the process of considering each of the events in the considered cell site, starting with the earliest event, (j=1).

Line 9 computes the duration of event. That is, since a particular grouping of reporting times is considered, the duration of an event is defined by the starting time, and the stopping time; i.e., by $[t_s, t_e]$.

Line 10 evaluates whether the computed duration of event j is close (as far geographical location as well as starting and stopping times) to an already considered event that control passes to line 11, which adds the site of the seed to the corresponding cluster, increments index j and line 12 returns control to line 9 (to assess the event next in time on site i. Otherwise, control passes to line 14.

Line 14 initializes the iterative process, by setting the center location of the event at the geographical location of the cell site i (that is, the geographical coordinates of the cell site's antenna). It also chooses a circular area of a small initial radius $r_0$, sets the number of sites within that area, $C^{A_c^r}$, at 1, sets the duration of the event relative to the center to the duration at cell site i, and sets the change of overall probability of an event impacting within the area centered on center c to some number a>0.

The iterative process proceeds by testing whether the duration of the event relative to the center is approximately the same as the duration of the event relative to the geographical location of the cell site i, and whether the change of overall probability of an event impacting within the area centered on center c is positive. If so—and it is so in the first iterative loop by the initialization process—then the steps of lines 16-19 increase the radius (and thereby increase the area) until at least one other cell site is found within the area.

At this point, line 21 computes a new geographical center (from the geographical coordinates of the encompassed cell sites) and line 22 sums the traffic loads of the encompassed cell sites. Line 23 employs the aforementioned statistical means for computing the duration of the event relative to the new center. Lastly, line 27 outputs the duration and expanse of the events.

Figure 2:
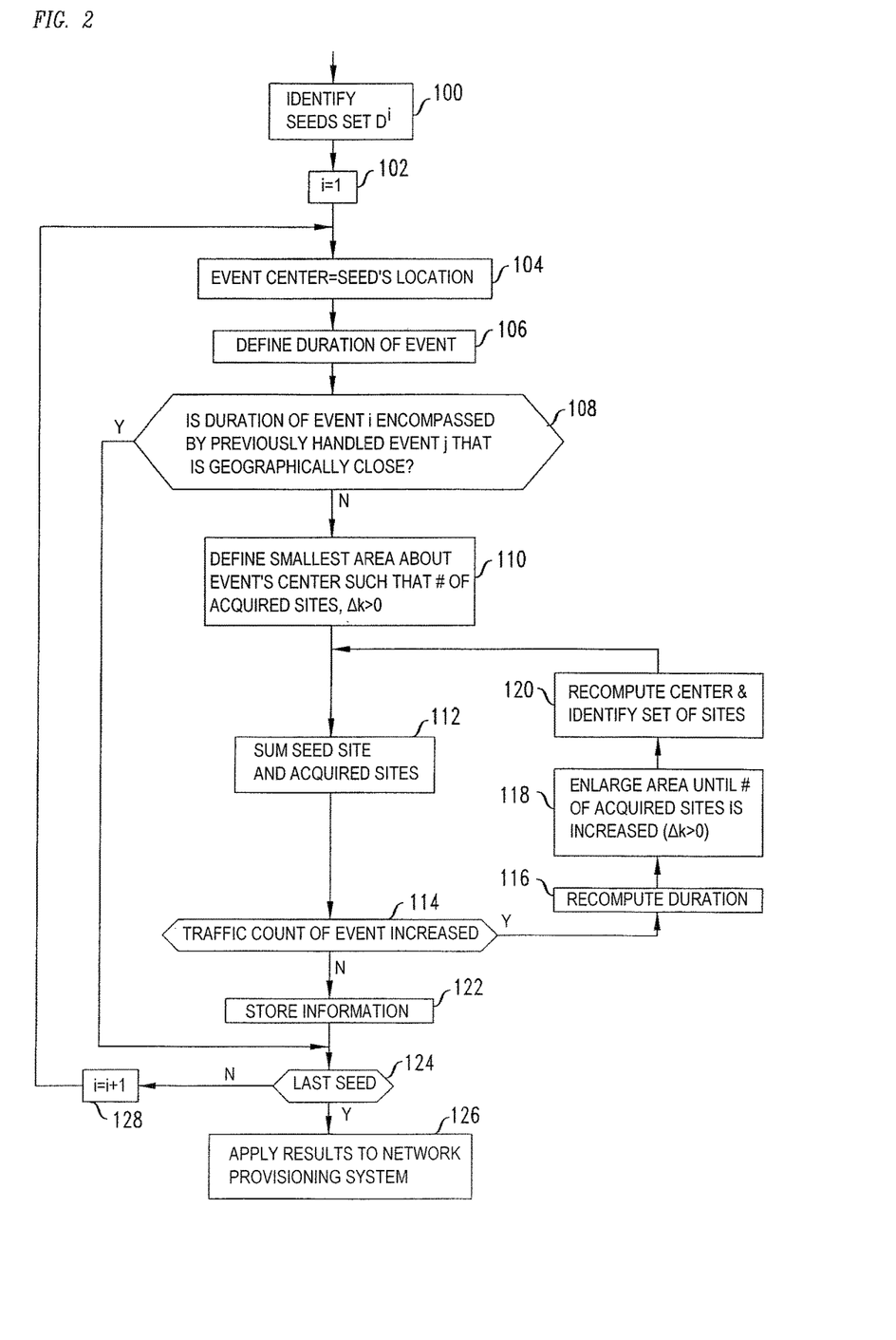
FIG. 2 presents a flowchart that represents another embodiment in accord with the principles disclosed herein.

FIG. 2 presents a block diagram of a second embodiment. Block 100 identifies the seeds pursuant to a process that, for example, follows steps 1-4 of FIG. 1. It is noted that any particular cell may have more than one seed (at different reporting times). The result is a set of seeds that, optionally, are not even sorted. Control then passes to block 102 where a first seed in the set is chosen (by setting variable i to 1), and control passes to block 104. Block 104 notes the geographical location of the cell site to which the chosen seed belongs and sets the current perception of the center of the event that is reflected by the seed to that geographical location. Control then passes to block 106 which identifies the duration of the event (i.e., the set of consecutive reporting times that correspond to the event) using the statistical approach disclosed above.

It is possible that the considered seed (other than the very first seed, of course) was already accounted for while considering a previous seed. Therefore, control passes from block 106 to block 108, which considers whether the seed i that is to be currently considered has been previously handled when considering a previous seed, j. If it has been previously considered, control passes to block 124. Otherwise, control passes to block 110, which defines the smallest area (for example, a circular area about the event's perceived center with the smallest radius) that results in the addition of a cell site (from among all geographically neighboring cell sites; that is, Δ k>0, where k is the number of cell sites that are encompassed by the chosen area, It should be understood that the initial area or territory that is chosen is one that includes the site where the seed event resides plus some minimum number of additional sites. That area can be circular, thus being defined by a radius, and the radius can begin with some minimum value that is iteratively increased until another site is encompassed, or it can start with an incremental increase over the distance from the site where the seed event resides to the geographically next closest site. It is understood, of course, that an increase of the neighborhood that results in the addition of one cell site may result in the addition of a number of cell sites.

From block 110 control passes to block 112 where the traffic loads of the cell sites encompassed by the chosen area are aggregated (e.g., summed), and control passes to block 114, which determines, based on the statistical approach disclosed above (see line 23 in FIG. 1) whether the traffic count that is attributable to the event has increased. If so, control passes to block 114 where the event's duration is re-determined, and control passes to block 116, which computes the event's duration and passes control to block 118, which enlarges the geographical area of investigation only so much as to increase the number of encompassed cell sites. Control then passes to block 120 which re-computes the perceived event center and re-establishes the set of cell sites encompassed by the existing neighborhood size before returning control to block 112.

When block 114 concludes in the negative (that the traffic count attributable to the event has not increased), control passes to block 122, which stores the information about the addressed event, its perceived center and reach (i.e., the last-employed radius), and passes control to block 124. Block 124 determines whether the addressed seed is the last seed to be addressed. If not, control passes to block 128 which increments index I and returns control to block 104. Otherwise, control passes to block 126, which sends the information stored by block 124 to whatever network provisioning system the user of the method desires. This may comprise, for example, a schedule that is created from the stored information for delivering portable cells ("cells on wheels") to the appropriate geographical areas so that they can be employed when future events are expected.

Figure 3:
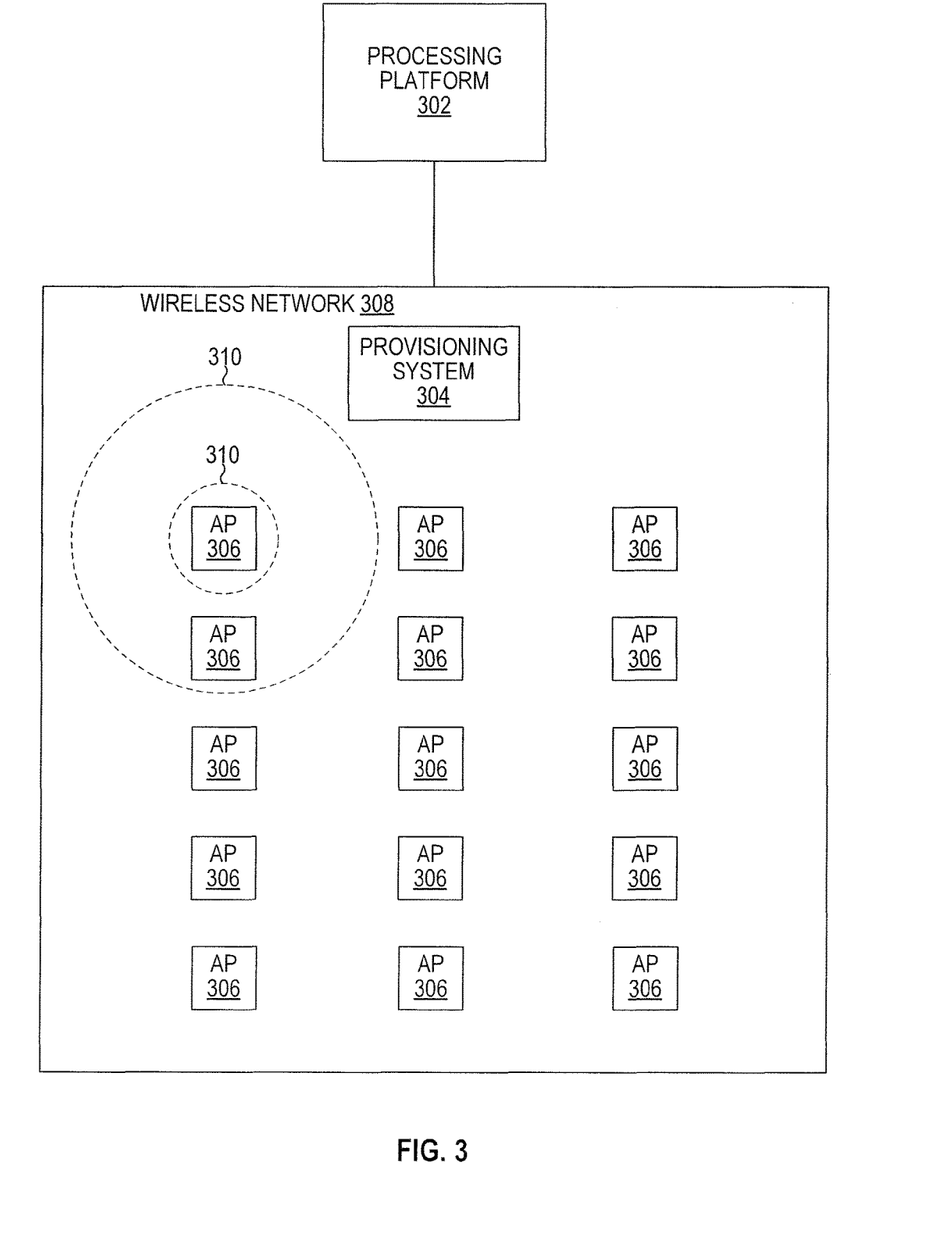
FIG. 3 illustrates a functional block diagram of a system consistent with at least one embodiment of the invention.

A method, executed on a processing platform 302, for enabling a wireless network 308 to be provisioned, includes collecting from access points (APs) 306 of said network, traffic volume data in successive time intervals. The method includes identifying event seeds, which are those of said APs where during one or more time spans of a preselected number of contiguous ones of said time intervals the traffic volume in said time intervals exceeds a chosen threshold. The method includes processing each of the event seeds, through iterative processing cycles, to identify for each of said event seeds an estimated event center and associated event impact territory. The method includes providing information about the events identified by said processing to a provisioning system 304 of wireless network 308. The territory may be expressed by a radius of a circle 310 centered about said associated event center. The processing in each of the processing cycles may include statistical analysis. The statistical analysis may be a Markov Modulated Nonhomogenous Poisson Process that is employed to estimate the probability with which said traffic data is indicative of an event. Each of the iterative processing cycles may include statistical analysis, and each such cycle may begin with one of said event seeds, which occurs at a particular AP, an estimated event center that is associated with geographical coordinates of said particular AP, and a territory that encompasses said particular AP and a minimum number, greater than zero, of neighboring APs, and at each of said cycles enlarging said territory and augmenting said estimated event center based on the APs encompassed by said enlarged territory, until a preselected condition is met that terminates said iterative processing. The territory may be defined by a radius of a circle about said event center, and at each cycle of the iterative processing said radius is enlarged only so much as to encompass a minimum number of APs that were not already encompassed in the immediately previous cycle. The condition may be met with traffic attributed to said event that is not increased with the enlarged territory.

The above embodiments and descriptions are, of course, illustrative, and other embodiments can be realized by a person skilled in the art. For example, while the above disclosure is couched in terms of a cellular network and cell sites, it should be realized that this, too, is merely illustrative and that any access point (AP) via which traffic can enter the telecommunication network, can serve as data sources.

What is claimed is:

1. A method comprising:
   identifying as event seeds by a processing platform, access points of a wireless network having traffic volume that exceeds a threshold during at least one time interval of a preselected number of successive time intervals;
   determining information for each of the event seeds by the processing platform, the information including an estimated event center and an event impact territory associated with the estimated event center, the event impact territory including the estimated event center and at least one neighboring access point, the determining iteratively enlarging the event impact territory until a preselected condition is met that terminates the determining; and
   providing the information by the processing platform to a provisioning system of the wireless network.

2. The method, as recited in claim 1 further comprising: provisioning the wireless network with a portable cell based on the information.

3. The method widget, as recited in claim 1 wherein the event impact territory includes an area of a circle centered about the estimated event center associated with the event impact territory.

4. The method widget, as recited in claim 3 wherein the each iteration of the enlarging increases a radius of the circle.

5. The method, as recited in claim 1 wherein the determining includes estimating a probability for traffic volume data being indicative of an event based on a Markov Modulated Nonhomogenous Poisson Process.

6. The method, as recited in claim 1 wherein identifying the estimated event center uses a weighted calculation based on geographical locations of the access points of a corresponding event seed of the event seeds and associated traffic levels.

7. The method, as recited in claim 1 wherein the preselected condition includes the event impact territory including an access point that is not impacted by an event associated with a corresponding event seed of the event seeds.

8. The method, as recited in claim 1 wherein the preselected condition is met in response to traffic attributed to said event not increasing with enlarging the event impact territory.

9. The method, as recited in claim 1 further comprising: creating a schedule for delivering portable cell sites to geographical areas based on the information.

10. The method, as recited in claim 1 wherein the determining includes, for each event seed, estimating the estimated event center based on an average of coordinates for all access points associated with the event seed.

11. An apparatus comprising:
a processing platform configured to identify as event seeds, access points of a wireless network having traffic volume that exceeds a threshold during at least one time interval of a predetermined number of time intervals and configured to determine information for each of the event seeds, the information including an estimated event center and an event impact territory associated with the estimated event center, the event impact territory including the estimated event center and at least one neighboring access point, the information being determined by iteratively enlarging the event impact territory until a preselected condition is met that terminates the iteratively enlarging; and
a provisioning system configured to provision a wireless network based on the information about the event seeds.

12. The apparatus, as recited in claim 11 wherein the provisioning system is further configured to provision the wireless network with a portable cell based on the information.

13. The apparatus, as recited in claim 11 wherein the event impact territory includes an area of a circle centered about the estimated event center associated with the event impact territory.

14. The apparatus, as recited in claim 12 wherein the each iteration of the enlarging increases a radius of the circle.

15. The apparatus, as recited in claim 11 wherein the processing platform is configured to determine the information using an estimate of a probability for traffic volume data being indicative of an event based on a Markov Modulated Nonhomogenous Poisson Process.

16. The apparatus, as recited in claim 11 wherein identifying the estimated event center uses a weighted calculation based on geographical locations of the access points of a corresponding event seed of the event seeds and associated traffic levels.

17. The apparatus, as recited in claim 11 wherein the preselected condition includes the event impact territory including an access point that is not impacted by an event associated with a corresponding event seed of the event seeds.

18. The apparatus, as recited in claim 11 wherein the preselected condition is met in response to traffic attributed to said event not increasing with enlarging the event impact territory.

19. The apparatus, as recited in claim 11 wherein the provisioning system is further configured to create a schedule for delivering portable cell sites to geographical areas based on the information.

20. The apparatus, as recited in claim 11 wherein the estimated event center for each event seed is based on an average of coordinates for all access points associated with the event seed.

* * * * *

UNITED STATES PATENT AND TRADEMARK OFFICE
CERTIFICATE OF CORRECTION

PATENT NO. : 9,544,785 B2  
APPLICATION NO. : 14/511562  
DATED : January 10, 2017  
INVENTOR(S) : Rong Duan et al.

Page 1 of 1

It is certified that error appears in the above-identified patent and that said Letters Patent is hereby corrected as shown below:

In the Claims

In Column 10, Line 38, Claim 3 please delete "widget";
In Column 10, Line 42, Claim 4 please delete "widget";
In Column 10, Line 42, Claim 4 please delete "the" after "wherein";
In Column 10, Line 43, Claim 4 please insert --iteratively-- before "enlarging";
In Column 11, Line 28, Claim 14 please delete "the" after "wherein";
In Column 11, Line 29, Claim 14 please insert --iteratively-- before "enlarging".

Signed and Sealed this
Fourteenth Day of March, 2017

Michelle K. Lee
*Director of the United States Patent and Trademark Office*